Aug. 7, 1951     D. B. MURRAY     2,563,355
CODE TRANSMITTER
Filed April 7, 1947     9 Sheets-Sheet 3
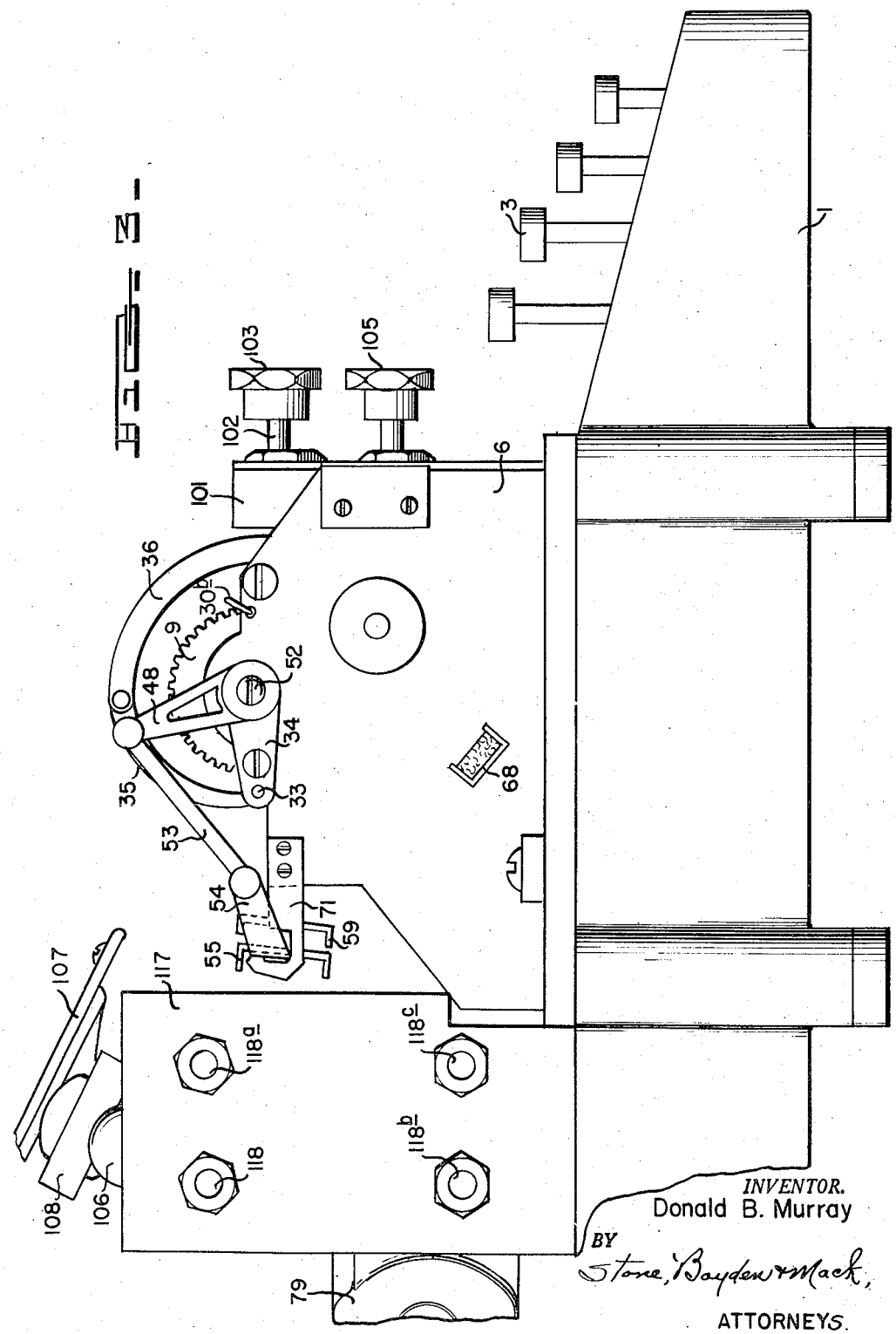
INVENTOR.
Donald B. Murray
BY Stone, Boyden & Mack,
ATTORNEYS Aug. 7, 1951 D. B. MURRAY 2,563,355
CODE TRANSMITTER
Filed April 7, 1947 9 Sheets-Sheet 4
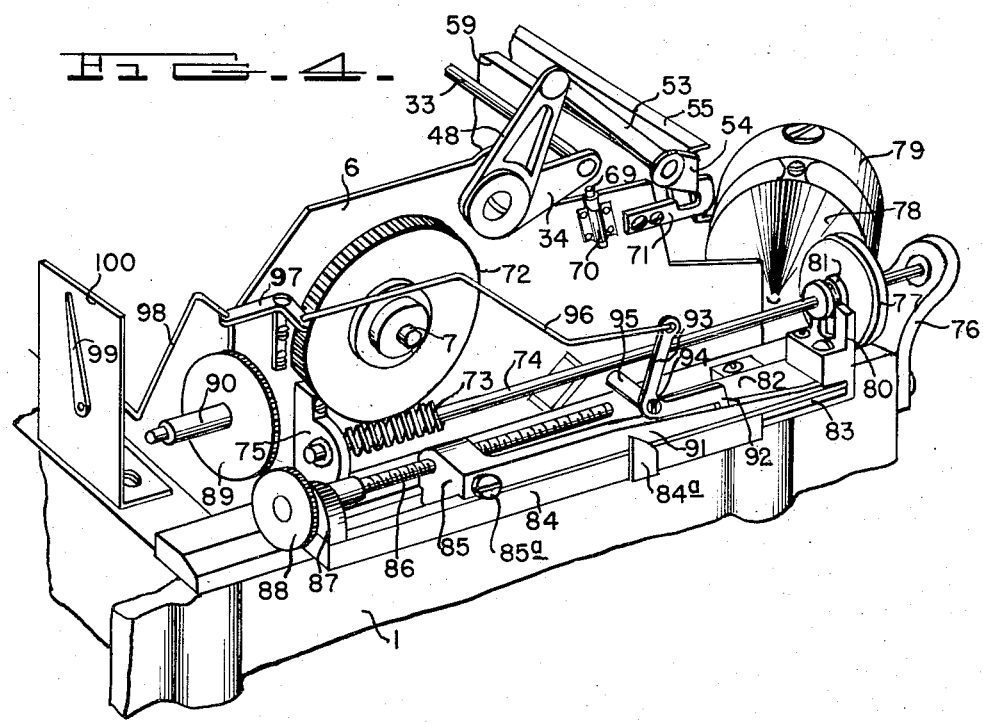
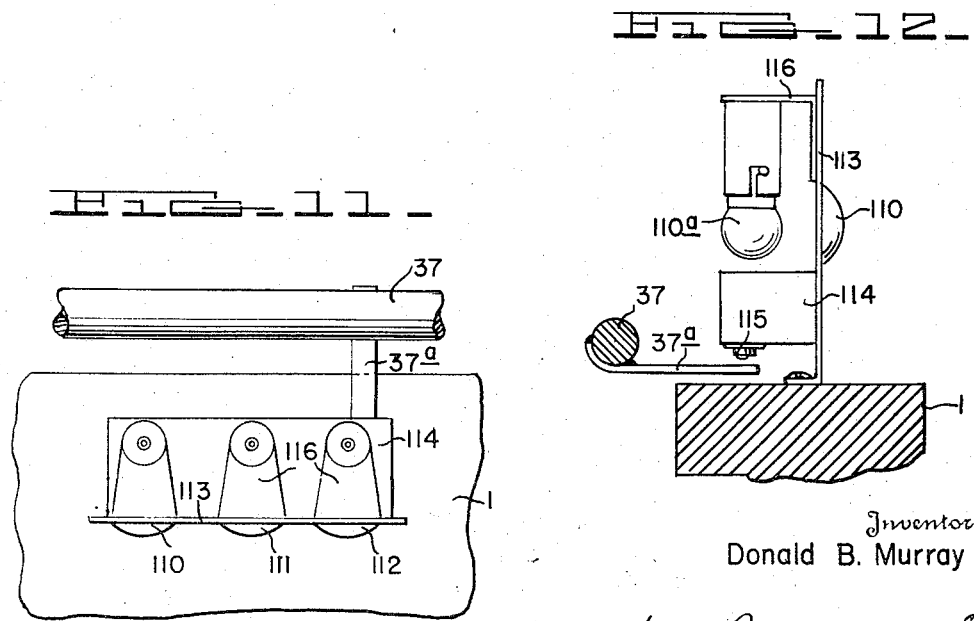
Inventor
Donald B. Murray
By Stone, Boyden & Mack
Attorneys

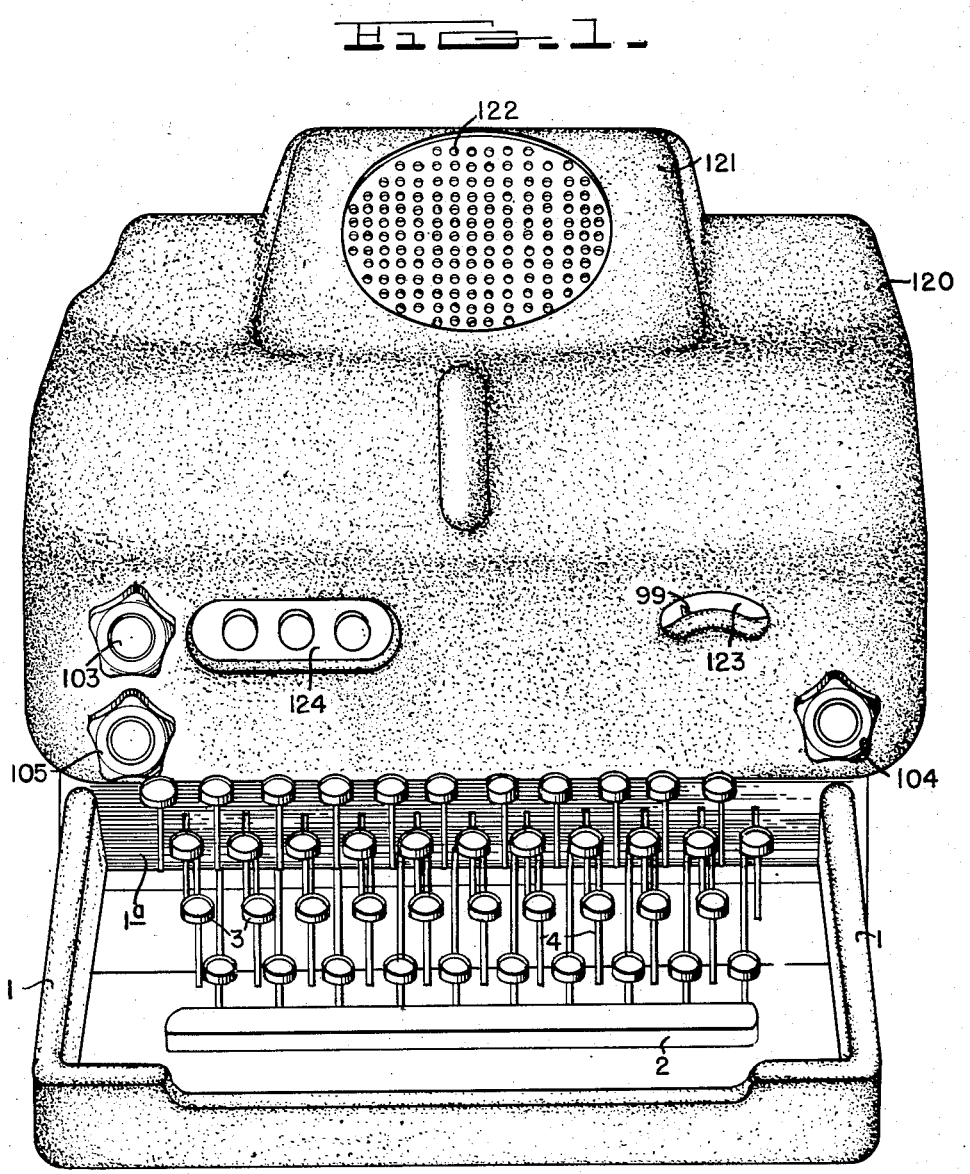

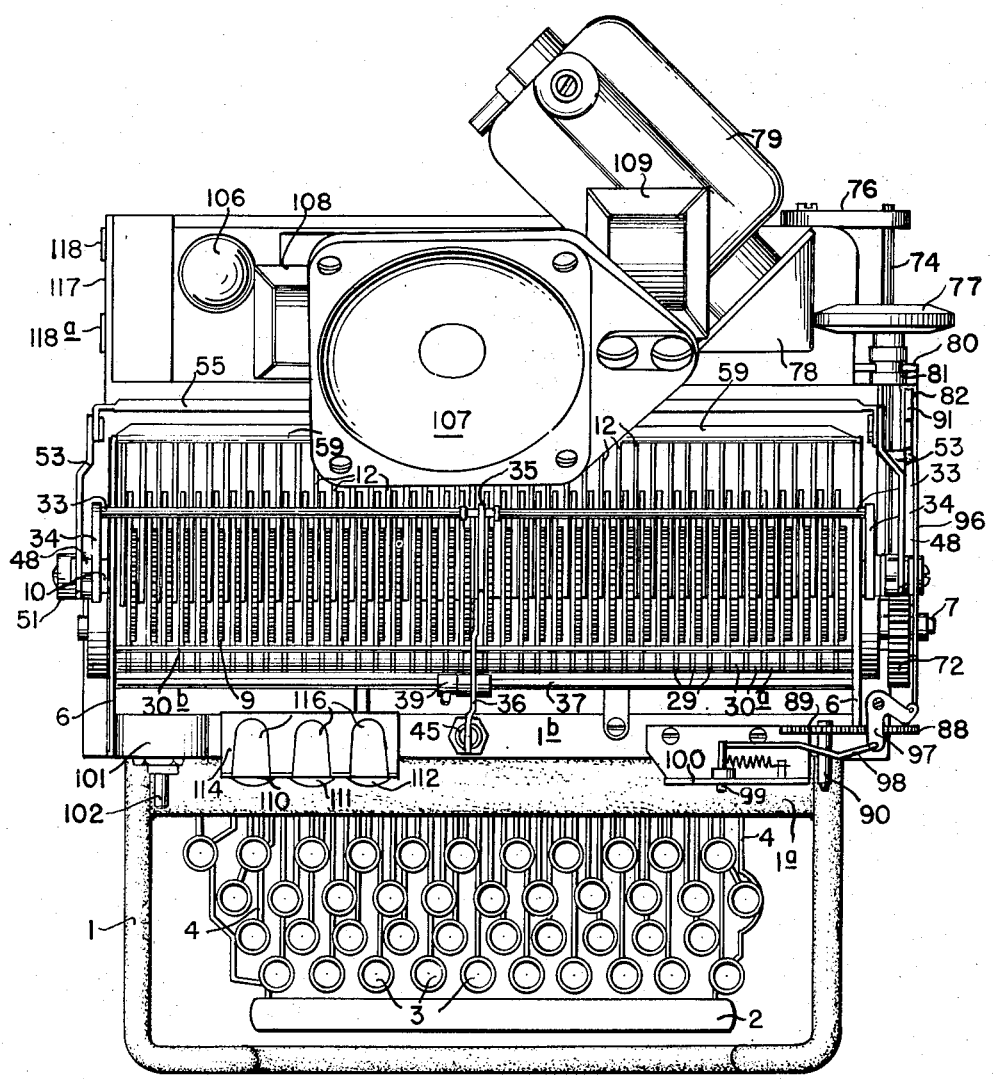

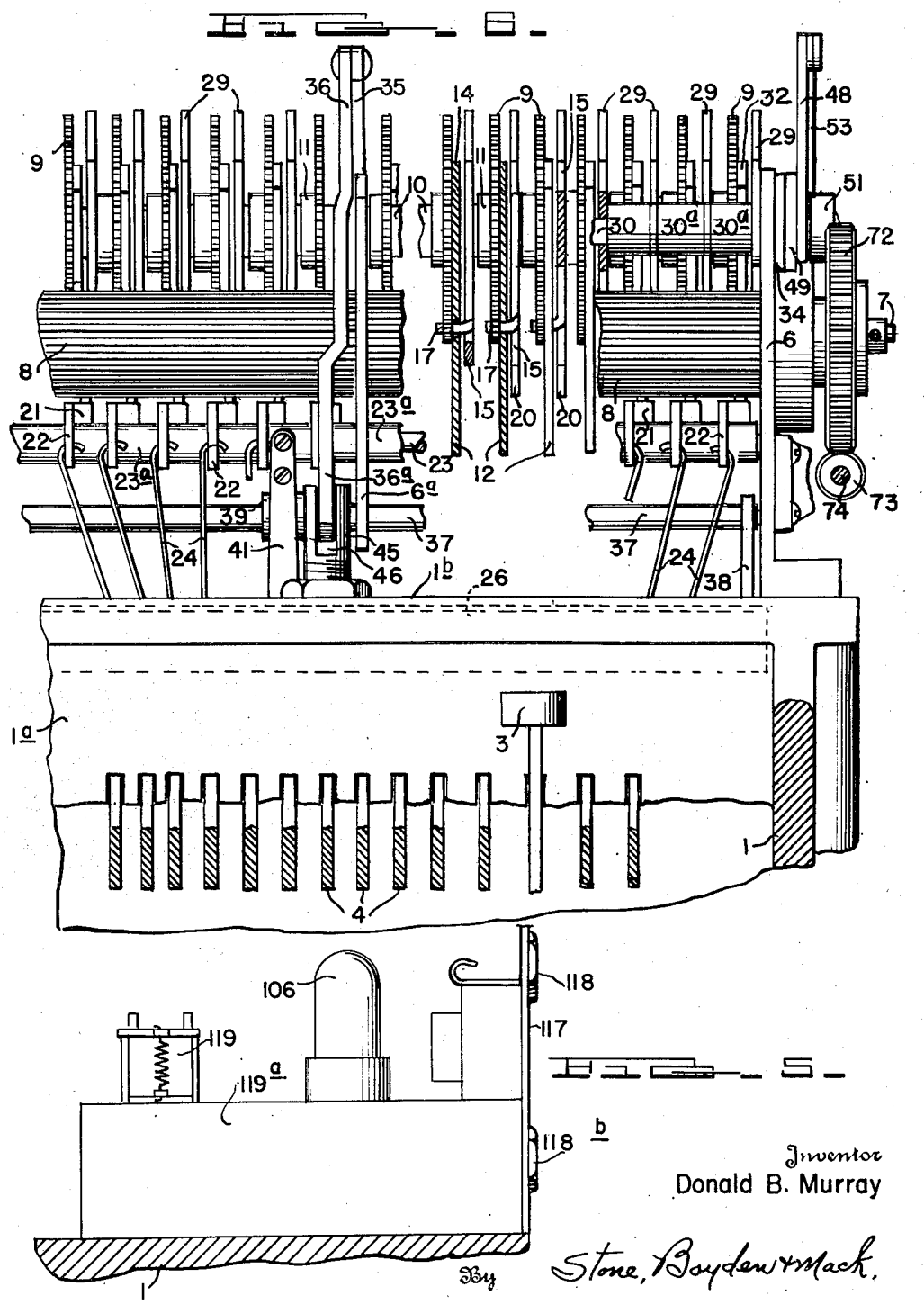

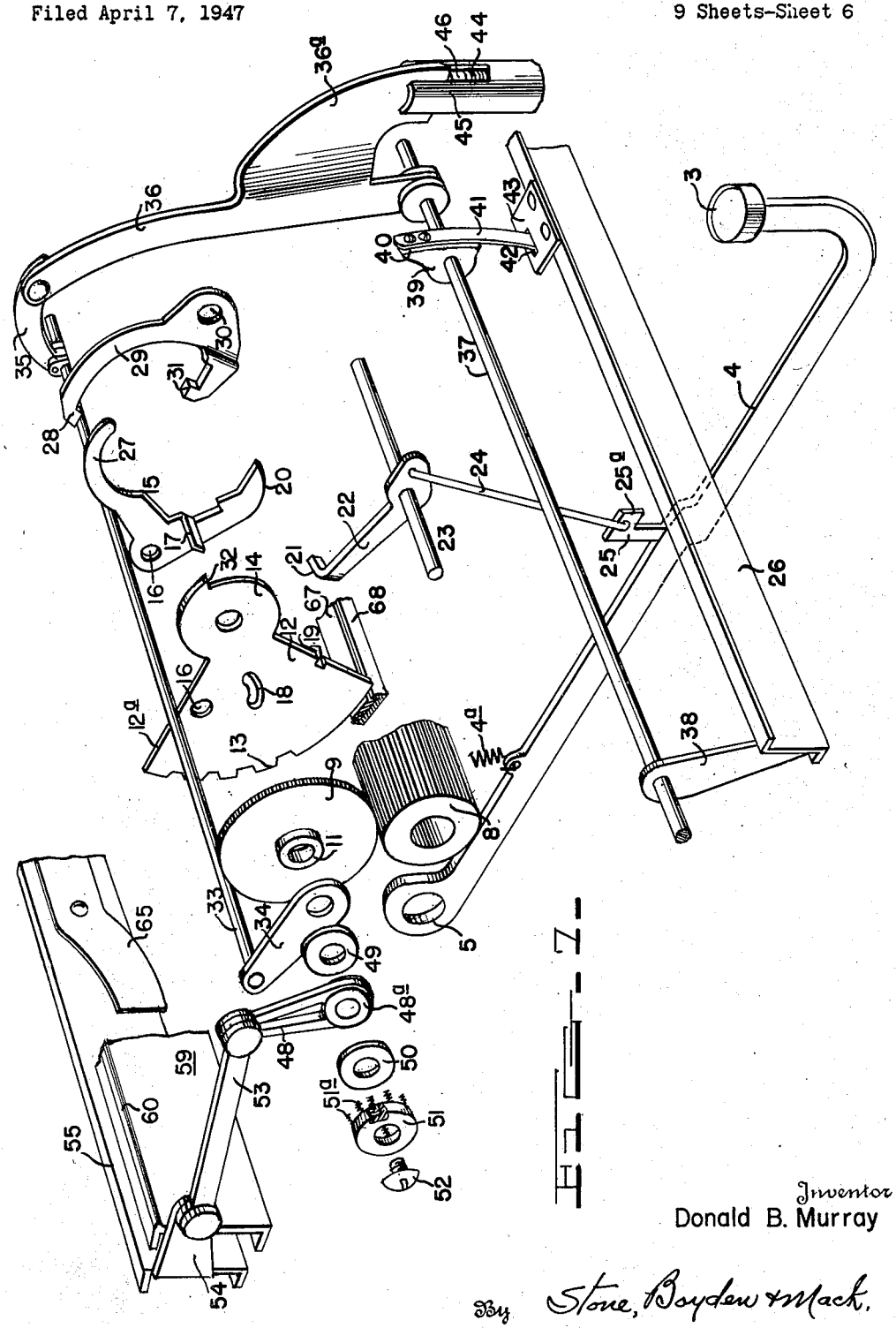

Aug. 7, 1951　　　D. B. MURRAY　　　2,563,355
CODE TRANSMITTER
Filed April 7, 1947　　　　　　　　　　　9 Sheets-Sheet 7
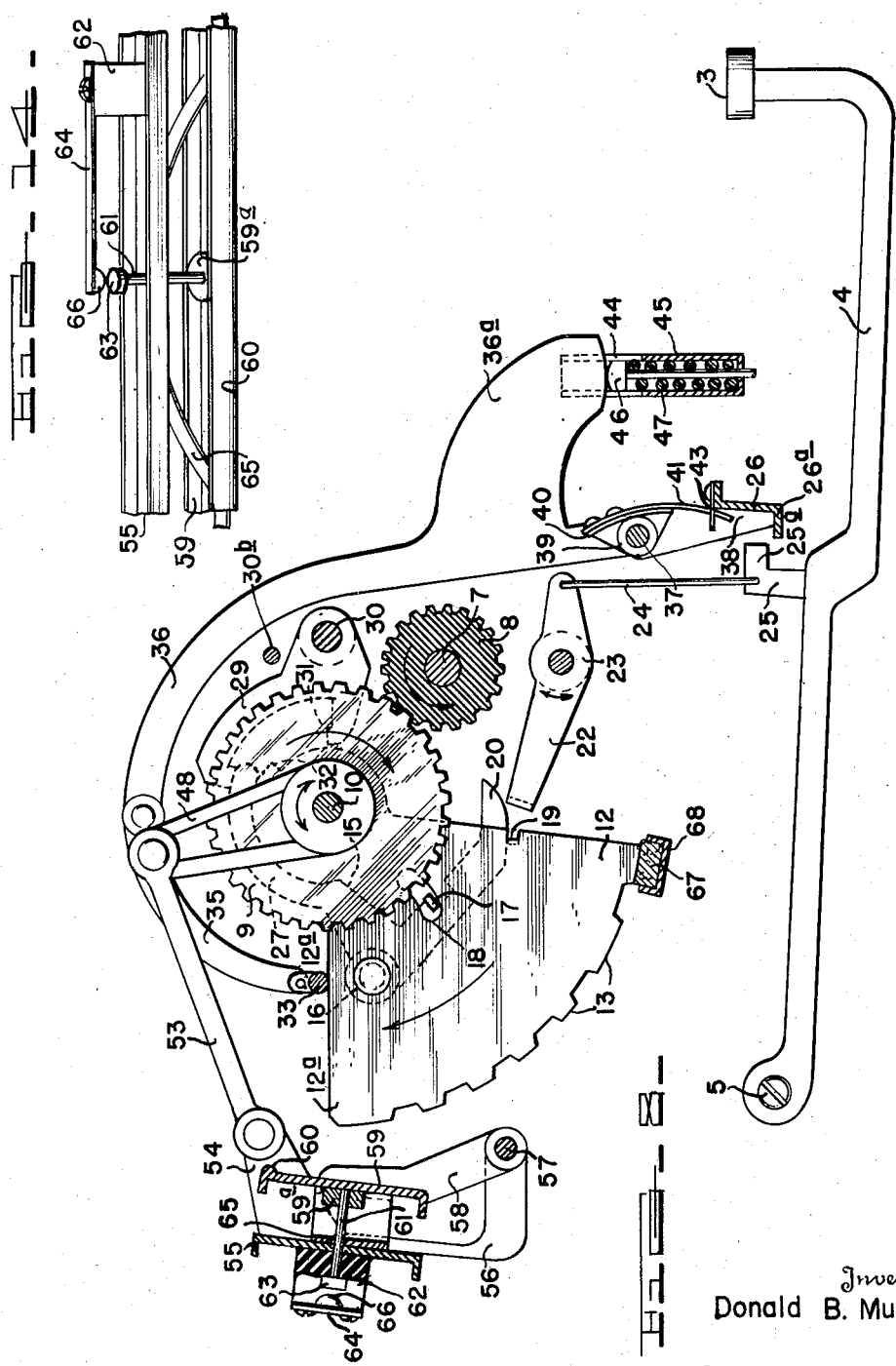
Inventor
Donald B. Murray
By Stone, Boyden & Mack
Attorneys

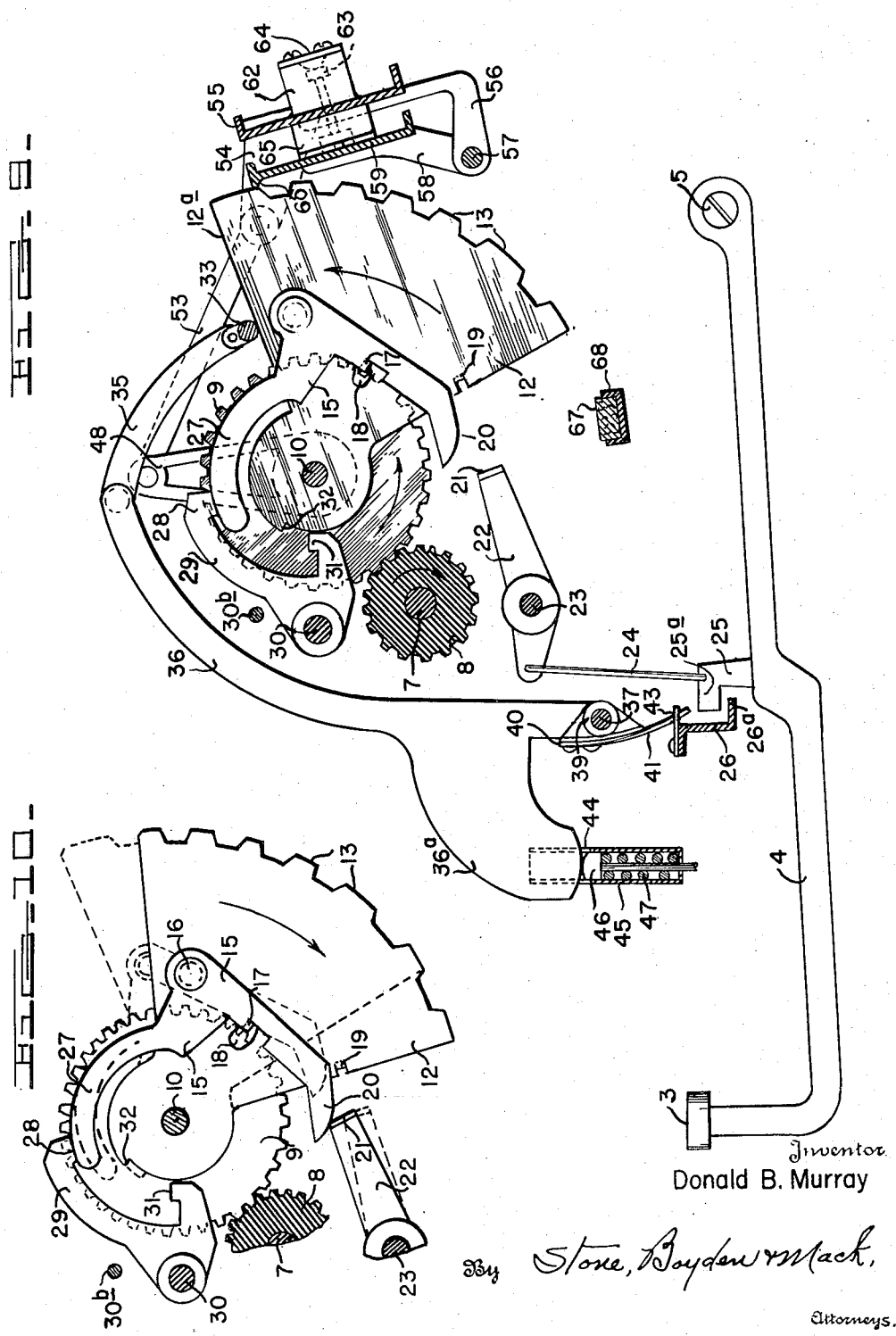

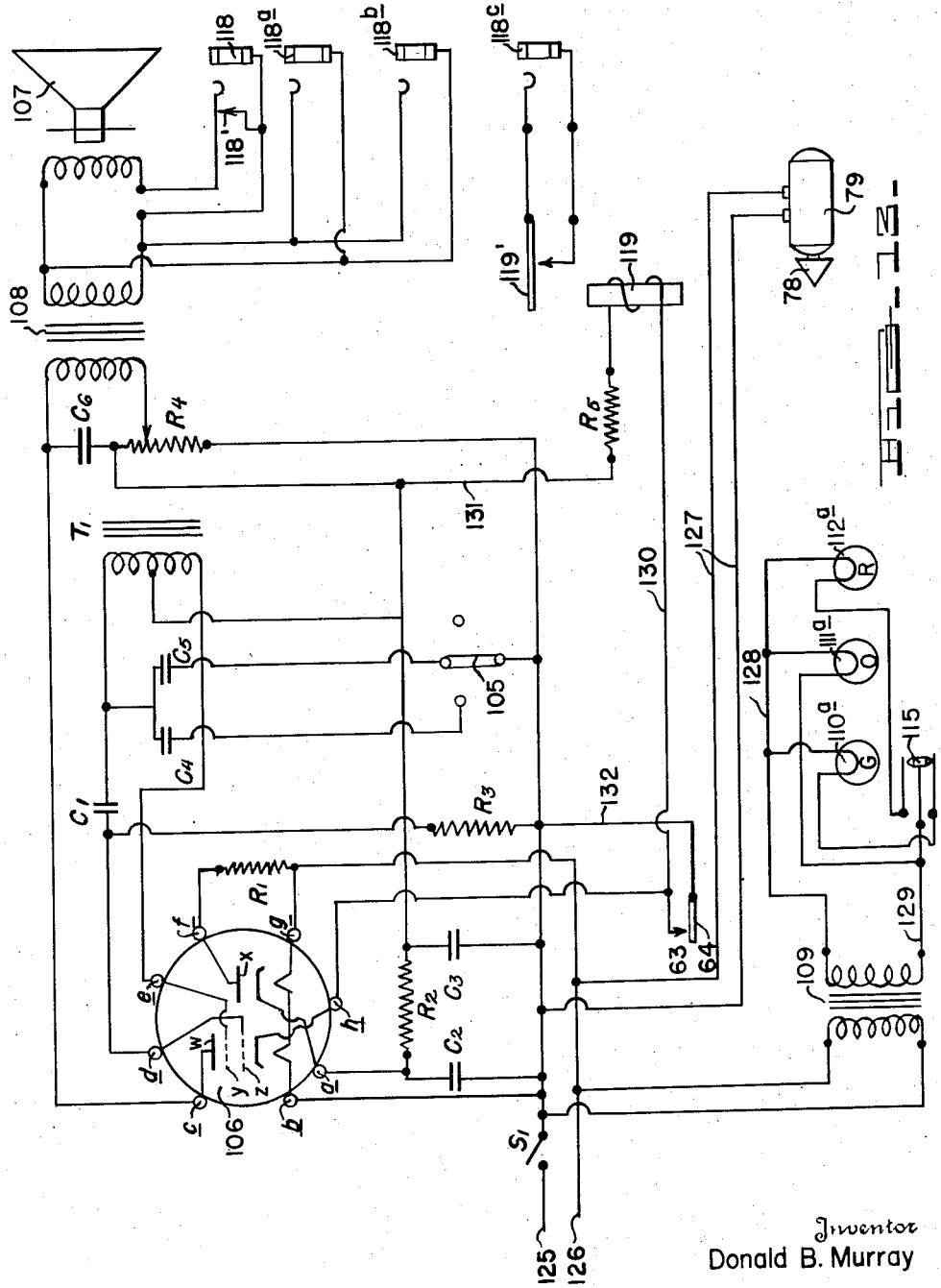

Patented Aug. 7, 1951

2,563,355

UNITED STATES PATENT OFFICE 2,563,355

CODE TRANSMITTER

Donald B. Murray, Colorado Springs, Colo.

Application April 7, 1947, Serial No. 739,971

18 Claims. (Cl. 178—79)

This invention relates to telegraph code transmitters and more particularly to transmitters of the keyboard type.

Many attempts have heretofore been made to devise keyboard operated code transmitters, but these attempts have been largely unsuccessful commercially. One reason for their lack of success appears to be that the code transmitting elements have in every case been moved directly by the key levers, thus producing results which were entirely dependent upon the particular characteristics of the person operating the keyboard.

In the present invention I obviate this difficulty by providing power-driven means for operating the code elements, such power-driven means being under the control of the keys making up the keyboard. Thus the code elements are moved at a speed which is wholly independent of the speed at which the keys are depressed.

The invention further provides means for varying the speed of the power-driven means, so that the time interval occupied by the transmission of each code character may be varied as desired, independent of the manner in which the operator depresses the keys. Thus perfect uniformity of the signals is achieved. The present invention embodies mechanism of the type in which a contact member or bar common to all of the code elements is provided. This bar is normally out of contact with the code elements, and one object of the invention is to provide improved means whereby the bar is automatically shifted into engagement with the code elements upon the initial movement of any selected element.

Another object of the invention is to provide improved means, operated by the movement of any code element upon the depression of a key, for locking all of the other keys against operation.

A still further object of the invention is to provide an improved one-cycle clutch arrangement between the power-driven means and each individual code element, such clutches being thrown into operation by the depression of the keys of the keyboard. Thus upon the depression and release of any key, the corresponding code element is caused to execute an operative stroke through a definite distance and then return to its original position.

A still further object of the invention is to provide simple and efficient means whereby the one-cycle clutch is caused to continuously repeat its operation so long as the corresponding key is held or maintained in the depressed position. Thus by simply holding down a key, the operator can cause the machine to continuously repeat the same character.

Yet another object of the invention is to provide a transmitter employing an audio-frequency oscillator coupled to a loud speaker, to produce the code signals, and to incorporate such speaker and all of its associated parts in a single self-contained unit with the keyboard operated mechanism.

A still further object is to provide such a unit with a plurality of telephone jacks, so arranged that by inserting suitable plugs into these jacks the signal impulses generated by the oscillator and code elements may be transferred to head phones, either in addition to the local speaker or as a substitute for such speaker, or the code signals may be conducted to an outside speaker located at any desired distance from the machine. I still further contemplate the provision of a jack connected with a pair of contacts operated by a relay controlled by the code elements, so that, by plugging into this jack a circuit including a suitable source of current and a relay controlling a radio telegraph broadcasting station or a land line, the signal impulses produced by the code elements may be transmitted over such broadcasting station or land line as desired. Thus my improved machine may be employed as a substitute for the usual manually operated transmitters commonly employed in radio or wire telegraphy.

With the above and other objects in view, and to improve generally on the details of such apparatus, my invention consists in the construction and arrangement of parts hereinafter described and claimed, and illustrated in the accompanying drawings, forming part of this specification, and in which Fig. 1 is a perspective view of the front of my improved code transmitter as it appears when in use;

Fig. 2 is a plan view thereof, with the casing removed to show the mechanism;

Fig. 3 is an elevation of one side of the machine shown in Fig. 2;

Fig. 4 is a perspective view of part of the mechanism at the opposite side of the machine;

Fig. 5 is a fragmentary elevation of a portion of the rear of the machine;

Fig. 6 is a fragmentary view on an enlarged scale looking at the front of the machine, parts being in elevation, parts in section and other parts broken away;

Fig. 7 is an exploded view showing one key lever and the one-cycle clutch and associated parts controlled thereby, and also illustrating the contact bar;

Figs. 8 and 9 are transverse sections on substantially the same plane through the mechanism shown in the central portion of Fig. 2, these sectional views being taken from opposite directions and the two views showing the mechanism in slightly different positions;

Fig. 10 is a fragmentary view similar to Fig. 9 but illustrating the operation of the mechanism when the key is held depressed to continuously produce repeat operations;

Fig. 11 is a fragmentary plan view on an enlarged scale showing the signal lights illustrated in Fig. 2, and means for operating the same;

Fig. 12 is an end elevation of the signal light assembly shown in Fig. 11, parts being in section;

Fig. 13 is a diagram showing the electrical apparatus and circuits therefor, embodied in the machine; and Fig. 14 is a fragmentary plan view of the code-transmitting contacts shown in Figs. 8 and 9.

Referring to the drawings in detail the improved machine comprises a frame 1 which may be similar to that of a standard typewriter. In this frame is mounted a keyboard comprising the usual spacing bar 2 and keys 3 carried by key levers 4 pivoted at their rear ends at 5. The key levers extend through the usual guide slots formed in a vertical plate 1a constituting part of the frame.

The improved mechanism embodied in the machine is supported by two special end plates 6 and a central plate 6a rigidly attached to the frame.

Secured to a shaft 7 journaled in the plates 6 is a toothed roller or cylindrical gear 8. With this cylindrical gear mesh a series of spur gears 9 freely journaled on a shaft 10 supported by said plates and provided with spacing bushings or collars 11. A series of code elements 12 are provided, these being in the form of thin, flat sector-shaped plates, each having on its arcuate edge suitable character-transmitting means such as code teeth 13, as best shown in Figs. 7, 8 and 9. These teeth, of course, have relatively long and short surfaces, to produce the usual dots and dashes making up the code signals.

Each of the sector-shaped code elements 12 is provided with a hub portion 14 also journaled on the shaft 10, each code element 12 lying in close contact with its associated gear 9, as clearly shown in Fig. 6.

Mounted closely adjacent each code element 12 is a one-cycle clutch mechanism comprising relatively thin flat elements 15 and 29, best shown in Fig. 7, and these elements, when assembled, lie in the same plane as shown in Fig. 6.

The element 15 is pivoted at 16 to the sector-shaped code element 12 (see Fig. 9), and all of the elements 29 are pivotally mounted on a shaft 30, extending parallel to the shafts 7 and 10 and supported in the frame plates 6. They are maintained in proper spaced relation by means of spacing washers 30a, and are limited in their angular movement by a stop rod 30b supported by the frame and extending parallel with the shaft 30 adjacent the elements 29 (see Figs. 2, 8 and 9).

The element 15 has a portion struck-out from one edge thereof to form an axially extending lug 17, which, when the parts are assembled, extends freely through an elongated opening 18 in the associated code element 12, and lies in a position adjacent the periphery of the gear 9, as best shown in Fig. 8.

Struck up from one of the radial edges of the code element 12 is a lug 19 serving as a stop which engages the element 15 to limit its angular movement about its pivot 16.

As will be clearly seen from Fig. 7 the element 15 is of generally bell-crank shape, the lower arm thereof having a rounded or cam edge portion 20. This is adapted to engage the bent end 21 of a lever 22 pivotally mounted on a shaft 23 supported in the frame plates. The end of this lever, opposite the portion 21 is connected by means of a link 24 to a lug 25 projecting upwardly from the key lever 4. It will be understood that there is a lever such as 22 connected with each key lever making up the keyboard, and that the number of such levers and the number of keys is the same as the number of code elements.

Extending transversely of the machine just above the key levers 4 is a movable locking bar 26 having a lower horizontal flange 26a adapted at times to move into a position beneath an angular extension 25a on the lugs 25.

The upper arm of the element 15 comprises a curved or arcuate portion 27 which normally lies on an arc substantially concentric with the gear 9. The element 29 is similarly curved or arcuate and has at its end an inwardly extending lug 28 which rides upon the outer edge of the curved portion 27 of the element 15, as clearly shown in Fig. 9.

The element 29, which is also of bell-crank shape, has the lower arm formed with a square end 31 adapted to engage a shoulder 32 formed on the hub 14 of the code element 12.

From the foregoing it will be understood that when the parts of the machine are in normal or idle position, all of the code elements 12 are in registry with each other and with their upper radial edges 12a lying in the same horizontal plane.

Extending transversely of the assembled series of code elements and resting upon the upper edges 12a thereof is a rod 33 carried by a pair of arms 34, one at each side of the machine, these arms being journaled upon the shaft 10.

Adjacent its center, the rod 33 is connected with one end of a link 35, the other end of which is pivotally connected to the upper end of a lever 36 secured to a shaft 37 extending parallel with the rod 33 and journaled in the frame of the machine. One or more arms 38 are pivoted on the shaft 37 and are secured to the locking bar 26, so as to movably support this bar.

Secured to the shaft 37 near its middle is a block 39 having an arcuate edge 40 disposed in a substantially vertical direction, and mounted on and rigidly secured to this arcuate edge is a leaf-spring 41, the lower end of which extends down freely through an opening 42 in a plate 43 secured to the locking bar 26.

Projecting forwardly from the lower portion of the lever 36 is an extension 36a. The end of this extension works freely in a vertical slot 44 formed in the upper end of a hollow post 45 secured to a transversely extending portion 1b of the frame (see Fig. 6), and engages a plunger 46 working within the hollow post and resiliently supported by means of a helical spring 47 (see Figs. 8 and 9).

Freely mounted on the shaft 10 adjacent each arm 34 is an arm 48 having a thickened hub portion 48a. Friction washers 49 and 50 are disposed on either side of the hub 48a, the washer 49 being interposed between such hub and the arm 34. A third washer 51 containing axially extending helical springs 51a is mounted outside of the washer 50, and the entire assembly is held together by a screw 52 bearing against the washer 51 and set into the end of shaft 10.

From the foregoing it will be seen that the springs 51a serve to maintain the parts 34, 49, 48a and 50 in close engagement and to in effect provide a friction clutch or coupling between the arms 34 and 48.

A link 53 is pivotally connected at one end to the free end of each arm 48 and at its other end to an angle bracket 54 secured to one end of a transversely extending bar 55, shown as of channel shape. This bar 55 is rigidly attached at each end to a bracket 56 pivotally mounted on a transversely extending shaft 57.

Adjacent and parallel with the bar 55 is a second bar 59, this bar 59 being secured at each end to a bracket 58 which brackets are also pivotally mounted on the shaft 57. Thus the entire assembly, comprising both bars 55 and 59, is mounted to swing about the shaft 57.

A leaf-spring 65 is interposed between the bars 55 and 59 and resiliently maintains them in the spaced relation shown in Fig. 8.

Set into a block 59ª, welded or otherwise secured to the inside of the bar 59 is a contact pin 61. This passes freely through an opening in the bar 55. The pin terminates at its free end in a head 63 which is adapted at times to engage a contact point 66 carried by one end of a contact spring 64, the other end of which is mounted upon the insulating block 62. Thus when the parts 63 and 66 are brought together they serve to close a circuit between the frame of the machine and the insulated contact spring 64.

In order to brake and silence the angular movement of the code elements 12 on their pivot there is preferably provided a strip of soft material 67 mounted in a holder 68 and extending transversely of the machine at such a point as to frictionally engage the arcuate edges of the code elements as shown in Figs. 8 and 9.

Referring now to Fig. 4, it will be seen that there is provided a bumper 69 beneath the arm 34 to cushion the swinging movement thereof, this bumper being carried by a bracket 70 secured to the plate 6. Furthermore, in order to limit the movement of the bracket 54 and associated parts, there is provided a notched stop bracket 71, also secured to the plate 6, within the notch of which the bracket 54 operates.

Secured to the end of shaft 7 is a worm gear 72, and this meshes with a worm 73 carried by a shaft 74, journaled in bearings 75 and 76. Keyed on this shaft for sliding movement relative thereto is a friction wheel 77 adapted to engage a conical driving element 78 secured to the shaft of an electric motor 79 (see Figs. 2 and 4).

A fork member 80 works in a grooved collar 81 secured to the friction wheel 77 and this fork is secured to a member 82 slidably mounted on a bed plate 84, and connected therewith by a groove 83, said member having at its opposite end a nut 85 engaging a screw 86 journaled in a bearing 87 and carrying at its free end a spur gear 88. This gear meshes with another gear 89 secured to a shaft 90 which is shaped at its free end to receive a control knob 104 (see Fig. 1).

Set into the member 82 adjacent the nut 85 is a stop screw 85ª adapted to engage a stop lug 84ª carried by the bed plate.

Formed on the member 82 is a wedge-shaped cam 91, on the inclined surface of which rides the end 92 of a bell-crank lever 93 pivoted at 94 to a support 95. A link 96 is pivotally connected at one end to the bell-crank lever 93 and at its other end to one arm of another bell-crank lever 97, the other end of which is connected by a link 98 to the shaft of a pointer 99 pivotally mounted on a vertical plate 100 secured to the frame of the machine.

Referring now to Figs. 2 and 3, there is provided near the front of the machine a combined on-off switch and volume control 101, having a shaft 102 to which is secured a control knob 103. Immediately beneath this volume control unit is a tone control unit having a control knob 105 secured thereto. The control knobs 103, 104 and 105 project through the casing of the machine as clearly shown in Fig. 1.

A radio tube 106 is mounted within the casing at the rear of the machine, being supported on a suitable chassis 119ª, as shown in Fig. 5. This tube is provided with eight prongs or terminals, designated $a$ to $h$ inclusive, as indicated in Fig. 13, and is preferably of the type commercially known as 117L7. This tube has a main plate $w$ connected to the terminal $c$ and a rectifier $x$ connected to the terminal $f$. A screen grid $y$ is connected to the terminal $e$ and a control grid $z$ is connected to the terminal $d$. A loud speaker 107 of any suitable type is rigidly mounted upon a bracket at the rear of the machine and is disposed above the code transmitting mechanism heretofore described, as shown in Fig. 3. A transformer 108 suitably connected with the tube and speaker is also mounted at the rear of the machine adjacent the speaker as shown in Fig. 2. Another transformer 109 is likewise mounted adjacent the speaker and has its secondary connected to a series of three signal lamps 110ª, 111ª and 112ª. (See Figs. 12 and 13.) These signal lights are supported from brackets 116 secured to a vertical plate 113, in which plate are set colored bullseyes 110, 111 and 112, immediately in front of the lights.

Also secured to the rear of the plate 113 is a switch box 114 having on its lower side a push button 115 which controls the circuits to the lights, as hereinafter more fully explained. This push button is operated by an arm 37ª secured to the shaft 37 and extending forwardly therefrom to a position beneath the push button. When the shaft 37 rocks the arm 37ª is moved upwardly and moves the push button 115 upwardly, thus changing the circuits to the lights.

Referring now to Figs. 2, 3 and 5 it will be seen that at the rear of the machine on the left hand side is mounted a vertical plate 117 in which are set a plurality of jacks, four of such jacks being shown and designated 118, 118ª, 118ᵇ and 118ᶜ. These jacks are designed to receive suitable plugs for transferring the code signals to circuits outside of the machine, as hereinafter more fully described.

Finally mounted on a suitable support, as for example on the chassis 119ª is a sensitive relay 119. As will later more fully appear this relay is for the purpose of transferring the code signal impulses to an outside circuit, through one of the jacks above referred to.

Referring again to Fig. 1, the entire code transmitting mechanism, with the exception of the key board, is enclosed with in a housing or casing 120, and it will be understood that this housing at the rear is shaped to include and enclose the motor 79 also. The housing includes a dome or raised portion 121 which encloses the speaker 107, and this dome is preferably provided with a foraminous or other suitable cover 122, through which the sound can freely pass.

The front of the casing is provided with a sight opening 123 through which the end of the pointer 99 is visible, and also with an opening 124 through which the colored bullseyes 110, 111 and 112 are visible.

In Fig. 13 there is shown the circuit connections of the various electrical parts above mentioned. Referring to this figure, alternating current is supplied to the machine through leads 125 and 126. Included in the lead 125 is a switch $S_1$ which forms part of the volume control unit 101. The motor 79 is connected by wires 127 across the leads 125, 126, so that when the switch $S_1$ is closed the motor is supplied with current. At the same time the radio tube 106 is energized from conductors also connected across the leads. Thus when the control switch is closed the tube and the motor are simultaneously put into operation.

The volume control in this diagram is indicated by the high resistance element $R_4$, adjustably connected with the transformer 108, and the tone control is indicated by the switch 105 which may engage contacts connected to either one of the two condensers $C_4$ and $C_5$, or may be moved to a position in which it connects with neither of these condensers. Thus the speaker may be caused to operate with three different tones.

$T_1$ designates the audio oscillatory transformer and this is connected with various terminals of the tube in the usual manner.

In the diagram, $C_1$, $C_2$ and $C_3$ are condensers, the two latter being preferably of the electrolytic type. $C_6$ is also a condenser having a capacity of the order of .001 mfd.

$R_1$, $R_2$ and $R_3$ are resistors which may in practice have values of 47 ohms, 2000 ohms and 50,000 ohms, respectively.

In Fig. 13, as in the other views, 63, 64 designate the code signal contact points. One of these contact points, as 64 is connected by wire 132 with the lead 125, while for the control of code signals going to the speaker, the other contact point 63 is connected to the tube terminal $h$, the terminal $c$ being connected with one side of the speaker transformer 108.

In order to transfer the electric signal impulses to an outside circuit, the contact 63 is also connected by wire 130 to one side of the relay 119, the other side of this relay winding being connected through a high resistance $R_5$ by wire 131 through the filter $R_2$, $C_2$, $C_3$ to terminal $a$ of the tube. This terminal is connected with the cathode of the rectifier $x$, which, in turn, is connected to terminal $f$. Lead 126 is connected with this terminal through resistance $R_1$. Thus, by means of the rectifier, the relay 119 is supplied through contacts 63, 64, with direct current consisting of half-wave impulses, smoothed out by the above mentioned filter. The relay 119 is provided with an armature 119', this armature being moved into and out of engagement with an associated contact, under the influence of current impulses flowing through the relay. The armature 119' and its associated contact are connected to the two terminals of the jack 113ᶜ, so that by inserting a suitable plug into this jack the signal impulses may be transferred to an outside circuit.

The bullseye lights 110, 111, 112 are preferably green, orange and red, respectively. The light 111ᵃ associated with the bullseye 111 is permanently connected across the secondary of the transformer 109, by means of the conductors 128 and 129, so that it burns at all times when the machine is in operation. When the switch arm 37ᵃ (shown in Fig. 12) is in normal position, as illustrated, the switch in switch box 114 maintains the circuit of light 110ᵃ closed so that the green bullseye 110 is illuminated. This indicates that the code transmitting elements are all in normal position and the machine is ready to operate. When, however, any key is depressed and the corresponding code element is caused to move, the shaft 37, as hereinafter described, is rocked, and the arm 37ᵃ, engaging the push button 115, causes the circuit supplying light 110ᵃ to be broken and the circuit supplying light 112ᵃ, behind the red bullseye, to be supplied with current.

Thus the green light normally shows and indicates that the machine is ready, while during the interval that any code element is displaced or moving from normal position, the red light is displayed, thus indicating that at such time no other key should be operated.

Operation

A brief description of the operation of the machine will now be given.

It will, of course, be understood that there are as many code elements 12 provided as there are characters which it is desired to transmit, and that each code element carries on its arcuate edge means for transmitting its particular character.

When any of the keys 3 are depressed the corresponding lever 22 is rocked on its shaft and its end 21 brought into engagement with the end 20 of the member 15, thus rocking this member upon its pivot 16 and bringing the lug 17 inwardly into engagement with the teeth of the gear 9.

As previously described, this gear rotates continuously so long as the motor is running, being driven from the cylindrical gear 8 through the friction wheel 77 and worm 73 and worm wheel 72; therefore immediately upon the locking of the code element 12 to the gear 9, due to the engagement of the lug 17 with the teeth thereof, the code element commences to move upwardly as viewed in Fig. 8, being carried around by the gear 9.

As the upper edge 12ᵃ of the code element rises it engages and lifts the rod 33, and this swings the arms 34 on their pivots.

Because of the frictional connection between these arms 34 and the adjacent arms 48 the latter are dragged around toward the right as viewed in Fig. 8 thus, through the link 53, rocking the pair of bars 55, 59 about their supporting shaft 57. This rocking movement of this bar assembly brings the rounded upper edge 60 of the bar 59, into the path of travel of the code transmitting teeth 13. This is clearly shown in Fig. 9 which is a view of the reverse side of the code element from that shown in Fig. 8, but which illustrates such element as having partially completed its upward stroke, and as being in contact with the edge 60 of the bar 59.

As the code element 12 continues its upward movement from the position shown in Fig. 9, the teeth 13 pass successively over the edge 60 of the bar 59, thus causing said bar to oscillate on its pivot 57 and to move toward and from the bar 55, the interposed leaf-spring 65 permitting this relative movement.

As the bar 59 moves, the contact pin 61 slides freely through the bar 55 and its head comes into and out of engagement with the contact 66 carried by the contact spring 64.

As a result of this intermittent engagement of these contacts, controlled by the teeth of the code element, current impulses are set up which are transformed by the audio oscillator tube into code signals which are reproduced in the speaker 107.

As the code element 12 continues its upward movement as indicated in Fig. 9, the rod 33, operating through link 35, swings lever 36 about its pivot 37, thus compressing the spring 47, so that when the code element is released, this spring causes the rod 33 to move downwardly, thus restoring the code element to its normal position.

At the same time, the rocking of the shaft 37 operates, through the leaf-spring 41, to shift the locking bar 26 rearwardly into the position shown in Fig. 9, in which position the flange 26ª of the locking bar extends beneath the lugs 25ª on the brackets 25 carried by the key levers 4, thus preventing any of the keys from being depressed while any code element is in or moving toward its elevated position. When the displaced code element returns to normal position, the locking bar 26 is also shifted back to normal position as shown in Fig. 8.

Referring again to Fig. 9, the code element 12, having been coupled to the rotating gear 9 by the lug 17 as described is carried around and upwardly thereby until the shoulder 32 thereon engages the square end 31 of the bell-crank lever 29. This swings the bell-crank lever about its pivot 30 in a clockwise direction, thus causing the end 28 thereof to bear down upon the outer surface of the curved arm 27 carried by the member 15. This rocks the member 15 on its pivot 16, thus withdrawing the lug 17 from engagement with the teeth of the gear 9. The code element 12, thus released, is immediately returned to normal position by the spring 47 as above described.

It will be further noted that at the moment that the code element is released from the gear wheel 9 and begins its downward movement, the arms 34, are also swung downwardly with the code element operating through their frictional engagement with arms 48 to swing these latter arms also in a clockwise direction as viewed in Fig. 9, and to thus shift the contact bar assembly, 55, 59 toward the right so as to carry the rib 60 on the bar 59 out of the path of movement of the code transmitting teeth 13. Thus the downward or return stroke of the code element is an idle one, producing no signal impulses.

In other words, it will be noted that as any code element begins its upward stroke the contact bar 59 is moved into engagement with the code transmitting teeth, while as it begins its downward stroke this bar is moved out of the path of travel of such teeth.

It will further be understood that the momentary depression of any selected key serves to initiate the movement of the corresponding code element by throwing into operation the one-cycle clutch mechanism, and that after the element has moved through its predetermined cycle it is disconnected from the driving member and is automatically returned to normal position.

From the foregoing it will be seen that the speed at which the code elements are moved, and thus the time interval within which they execute their cycle and transmit a code character is wholly independent of the operation of the keys 3, but is determined solely by the speed of rotation of the driving member 8 and associated gears 9.

By operating the speed control knob 104 the screw 86 (Fig. 4) is rotated and the friction wheel 77 moved along the surface of the driving cone 78, thus varying through a wide range the speed at which the driving member 8 is rotated. In this way, the speed of transmission of the signals may be varied as desired, from very slow to very fast. The operator, by glancing at the pointer 99, can tell by its position, the approximate speed at which the machine is set.

It will be noted that the keyboard, including the keys 3 and spacing bar 2 is similar to a standard typewriter keyboard. An operator, in using the present machine, proceeds in the same manner as when using an ordinary typewriter, namely he spells out the words to be transmitted by selecting and depressing sequentially the keys corresponding to the characters making up each word, and after having spelled out each word, he will depress the spacing bar, in the usual manner.

While in the standard typewriter, the depression of this spacing bar serves to actually produce a space between the written words, the operation of the bar in the present machine serves only to interpose a time interval between the words. The mere act of momentarily pausing to depress the spacing bar will necessarily produce a slight time interval between successive words. However, if desired, the spacing bar may be operatively connected with a sector-shaped element similar to 12 but having no code transmitting means on its arcuate edge, or being slightly shorter than the code elements themselves, so that it at no time engages the bar 59. With this arrangement, the depression of the spacing bar would result in initiating the operation of the one-cycle clutch, and causing the blank code element to execute an up and down stroke, in the same manner as the active code elements are operated by the keys, and thus the actuation of the spacing bar would produce between words a time interval similar to that between letters. However, it will of course be understood that the operator may pause for any desired length of time between words.

It frequently happens, particularly when the machine is used for code instruction, that it is desired to repeat some particular code character a number of times. In the present machine this is accomplished automatically by merely holding the key in depressed position. It will be noted that the end of the lower arm of the member 15 is formed with a rounded or cam surface at its under side. This rounded cam surface is adapted to ride up on the lug 21 carried by the lever 22, when elevated by the depression of the key into the position shown in full lines in Fig. 10. The initial depression of the key moves the lever upwardly and swings the member 15 on its pivot, causing the lug 17 to engage the teeth of the gear 9, as above described and the code element immediately begins its cycle. The cycle will be completed and the code element returned in the manner above described, but by holding the key depressed and thus maintaining the lever 22 in its upper position the cam surface 20, as the code element returns to normal, will ride up on the lug 21 and thus again cause the lug 17 to engage the gear teeth. This immediately produces another cycle of movement of the code element, and these cycles will be repeated as long as the key is held in depressed position.

It will be seen that the machine constitutes a complete self-contained unit audibly producing the code signals from the concealed loud speaker. Thus an entire class of students may readily hear the code signals as they are produced by the machine under the control of the instructor.

If, however, it is desired to transfer the code signals to head phones or to an outside speaker, this may be readily accomplished by plugging the desired apparatus into the jacks above described.

Referring again to Fig. 13 the jack 118 is provided with conductors connected in series with the speaker circuit and normally bridged by a contact 118'. When a plug is inserted into this jack, this contact 118' is disconnected, and the ear phones associated with the plug are connected in series with the coil of the speaker. By properly proportioning the impedances of the head phones and speaker coil, the speaker may be silenced when the head phone is plugged in.

Jacks 118ᵃ and 118ᵇ are connected in parallel with each other and with the speaker circuit so that when plugs connected to ear phones or to an outside speaker are inserted in these jacks the code signals are transferred from the speaker circuit to these outside circuits.

The relay 119 connected with the jack 118ᶜ has already been described. It will, however, be understood that by plugging into this jack a circuit containing a source of current and another relay, the current impulses set up by the code contact points 63, 64 may be transmitted through such relay to a land line or broadcasting station, the present machine then serving as a substitute for the usual key transmitter.

What I claim is:

1. A code transmitter comprising a series of movably mounted code elements, means whereby each element, when moved, sets up electrical impulses corresponding with the particular character to be transmitted, a rotary driving member, means for continuously rotating said member, a one-cycle clutch for connecting each of said movable code elements with said driving member, a keyboard having a key for each code element, means whereby each key, when momentarily depressed and released, throws into operation the clutch associated with the corresponding code element, and means whereby each key, when held in its depressed position, causes said clutch to continuously repeat its cycle of operations.

2. A code transmitter comprising a series of movably mounted code elements, means whereby each element, when moved, sets up electrical impulses corresponding with the particular character to be transmitted, a rotary driving member, means for continuously rotating said member, a one-cycle clutch for connecting each of said movable code elements with said driving member, a keyboard having a key for each code element, and means actuated by each key for causing the associated clutch to either perform a single cycle and stop, or to continuously repeat such cycle, as desired.

3. A code transmitter comprising a series of sector-shaped code elements mounted on a common stationary shaft for pivotal movement only and having character-transmitting means on their arcuate edges, a series of gears, separate from said code elements, also mounted on said shaft for rotational movement only, and disposed one adjacent each code element, means for continuously driving all of said gears, a one-cycle clutch between each code element and its associated gear, and means for selectively actuating said clutches.

4. A code transmitter comprising a series of sector-shaped code elements mounted on a common stationary shaft for pivotal movement only and having character-transmitting means on their arcuate edges, a series of gears, separate from said code elements, also mounted on said shaft for rotational movement only, and disposed one adjacent each code element, means for continuously driving all of said gears, and one-cycle clutch means for selectively and momentarily coupling any desired code element to its associated gear.

5. A code transmitter comprising a thin, flat code element having character-transmitting means on one edge, means for movably mounting said element so that said edge travels in a fixed path, a contact member adapted to co-operate with said character-transmitting means, said member being normally out of the path of travel of said edge, means for moving said element so as to cause it to execute first an operative stroke through a definite distance, and then a return stroke, and means actuated by the initial movement of said element for shifting said contact member into engagement with the character-transmitting edge of said element during said operative stroke.

6. A code transmitter comprising a thin, flat code element having character-transmitting means on one edge, means for movably mounting said element so that said edge travels in a fixed path, a contact member adapted to co-operate with said character-transmitting means, said member being normally out of the path of travel of said edge, means for moving said element so as to cause it to execute first an operative stroke through a definite distance, and then a return stroke, and frictional means actuated by the initial movement of said element for shifting said contact member into engagement with the character-transmitting edge of said element during said operative stroke.

7. A code transmitter comprising a series of thin, flat, sector-shaped code elements pivotally mounted on a common axis and having character-transmitting means on their arcuate edges, a contact bar adapted to co-operate with the character-transmitting means of all of said elements, but being normally out of the path of movement thereof, means for selectively moving any desired element so as to cause it to execute first an operative stroke through a definite angle, and then a return stroke, and friction operated means actuated by the initial movement of the selected code element for shifting said contact bar into and maintaining it in engagement with the character-transmitting edge thereof during said operative stroke.

8. A code transmitter comprising a series of movably mounted code elements, means whereby each element, when moved, sets up electrical impulses corresponding with the particular character to be transmitted, means for individually moving said code elements, a keyboard containing a key for each code element, means whereby the depression of any key initiates the movement of the associated code element, and means actuated by the initial movement of such code element for locking all of the remaining keys.

9. A code transmitter comprising a typewriter keyboard having a series of keys and a spacing bar, a series of code transmitting elements associated one with each key, means controlled by said keys for selectively causing said code transmitting elements to operate to produce code signals, and a blank code transmitting element associated with and controlled by said bar, whereby the act of operating said bar in the usual manner serves to interpose a time interval between desired groups of code signals.

10. A code transmitter comprising a keyboard containing a series of keys, a series of movable code transmitting elements selectively controlled by said keys, a speaker, an audio frequency oscillator tube operatively associated therewith, means whereby said code transmitting elements, when operated, set up groups of signal impulses in the input circuit of said speaker, and a jack connected with said circuit, and so arranged that, by inserting a suitable plug therein, said signal impulses may be transferred from said speaker input circuit to another circuit.

11. A code transmitter consisting of a self-contained, unitary machine comprising a frame, a series of keys mounted in said frame, a series of movable, code-transmitting elements selectively controlled by said keys, a loud speaker carried by said frame, means whereby said code transmitting elements, when operated, set up groups of audio frequency code signal impulses in the input circuit of said speaker, a casing enclosing said code transmitting elements and said speaker, and a plurality of jacks, mounted on said frame, and connected with said speaker input circuit, said jacks being so arranged that, by inserting suitable plugs therein, said code signal impulses may be transferred from said speaker input circuit to different outside circuits, as desired.

12. A code transmitter comprising a series of movably mounted code elements, means whereby each element, when moved, sets up electrical impulses corresponding with the particular character to be transmitted, a rotary driving member, means for continuously rotating said member, means for selectively and momentarily coupling any desired code element with said driving member, to be moved thereby, and visual signal means for indicating whether all of the code elements are at rest and in normal position for operation, or whether any of said elements is out of such normal position.

13. A code transmitter comprising a series of movably mounted code elements, means whereby each element, when moved, sets up electrical impulses corresponding with the particular character to be transmitted, a rotary driving member, means for continuously rotating said member, means for selectively and momentarily coupling any desired code element with said driving member, to be moved thereby through a definite stroke, and visual signal means for indicating whether all of the code elements are at rest and in position for operation, or whether any of said elements is engaged in executing its stroke.

14. A code transmitter comprising a series of movably mounted code elements, means whereby each element, when moved, sets up electrical impulses corresponding with the particular character to be transmitted, a rotary driving member, means for continuously rotating said member, a clutch element pivotally mounted on each of said movable code elements for connecting the same with said driving member, a keyboard containing a key for each code element, and means actuated by each key for operating the clutch element associated with the corresponding code element.

15. A code transmitter comprising a series of movably mounted code elements, means whereby each element, when moved sets up electrical impulses corresponding with the particular character to be transmitted, a rotary driving member, means for continuously rotating said member, a clutch element pivotally mounted on each of said movable code elements for connecting the same with said driving member, a keyboard containing a key for each code element, and means actuated by each key for swinging the corresponding clutch element on its pivot so as to cause it to connect the associated code element with said driving member.

16. A code transmitter comprising a series of movably mounted code elements, means whereby each element, when moved, sets up electrical impulses corresponding with the particular character to be transmitted, a rotary driving member, means for continuously rotating said member, a clutch element pivotally mounted on each of said movable code elements for connecting the same with said driving member, said clutch element having one end projecting beyond the associated code element, a keyboard containing a key for each code element, and a member actuated by each key and constructed to engage the projecting end of said clutch element to operate the same.

17. A code transmitter comprising a series of movably mounted code elements, means whereby each element, when moved, sets up electrical impulses corresponding with the particular character to be transmitted, a rotary driving member, means for continuously rotating said member, a one-cycle clutch comprising a clutch element pivotally mounted on each of said movable code elements for connecting the same with said driving member, said clutch element having one end projecting beyond the associated code element, a keyboard containing a key for each code element, a member actuated by each key and constructed to engage the projecting end of said clutch element to swing said element on its pivot and throw said clutch into operation, said projecting end of said clutch element having a cam shaped edge adapted to ride on said member when the latter is held by the key in the path of movement of the former upon its return to normal position after completion of the cycle, whereby said clutch is again operated to repeat the cycle.

18. A code transmitter comprising a series of code elements each having an arcuate edge bearing character transmitting means, a stationary shaft on which said code elements are pivotally mounted, a rotary driving member, means for continuously rotating said member, a one-cycle clutch associated with each of said code elements for individually connecting the same with said driving member, said clutch comprising a clutch element movably mounted on the associated code element, and means for selectively operating said clutches.

DONALD B. MURRAY.

REFERENCES CITED

The following references are of record in the file of this patent:

UNITED STATES PATENTS

| Number | Name | Date |
|---|---|---|
| 876,069 | Lee et al. | Jan. 7, 1908 |
| 990,485 | Hayes | Apr. 25, 1911 |
| 1,164,737 | Mead | Dec. 21, 1915 |
| 1,566,476 | Hayes | Dec. 22, 1925 |
| 1,737,024 | Roe | Nov. 26, 1929 |
| 1,749,444 | Rae | Mar. 4, 1930 |
| 1,954,170 | Gibbs | Apr. 10, 1934 |
| 1,965,121 | Kardorff | July 3, 1934 |
| 2,284,024 | Stevens | May 26, 1942 |
| 2,341,222 | Lancaster | Feb. 8, 1944 |
| 2,352,031 | Steines | June 20, 1944 |

FOREIGN PATENTS

| Number | Country | Date |
|---|---|---|
| 195,100 | Great Britain | Jan. 11, 1921 |